United States Patent [19]

Arabori et al.

[11] Patent Number: 4,982,815
[45] Date of Patent: Jan. 8, 1991

[54] ELEVATOR APPARATUS

[75] Inventors: Noboru Arabori; Hideaki Takahashi, both of Katsuta; Yoshio Sakai, Ibaraki; Tsutomu Sano, Katsuta; Masao Nakazato, Katsuta; Masakatsu Tanaka, Katsuta; Katutaro Masuda, Katsuta; Mitsuo Saito, Katsuta; Yuji Toda, Hitachi, all of Japan

[73] Assignee: Hitachi, Ltd., Tokyo, Japan

[21] Appl. No.: 432,910

[22] Filed: Nov. 7, 1989

[30] Foreign Application Priority Data

Nov. 7, 1988 [JP] Japan .................................. 63-279275

[51] Int. Cl.$^5$ ................................................ B66B 5/02
[52] U.S. Cl. ...................................... 187/105; 187/108
[58] Field of Search ............... 187/105, 108, 109, 130, 187/133, 73, 77, 78

[56] References Cited

U.S. PATENT DOCUMENTS 4,923,055 5/1990 Holland .............................. 187/109
4,928,021 5/1990 Yonemoto ........................... 187/108

Primary Examiner—A. D. Pellinen
Assistant Examiner—W. E. Duncanson, Jr.
Attorney, Agent, or Firm—Antonelli, Terry, Stout & Kraus

[57] ABSTRACT

An elevator apparatus includes an electric motor for driving the elevator apparatus, an elevator cage adapted to be lifted or lowered by the electric motor, a brake device for holding and retaining an elevator driving system, including the electric motor, and a malfunction detecting device responsive to the application of a torque to a retainer section of the brake device during the lifting or lowering of the elevator cage.

11 Claims, 6 Drawing Sheets

ELEVATOR APPARATUS

BACKGROUND OF THE INVENTION

The present invention relates to an improvement of an elevator apparatus and, more particularly, to an improved elevator apparatus having an enhanced level of safety at the time when the brake device is out of normal operation.

In general, an elevator driving system is of a type wherein sheaves are rotated by an electric motor and an elevator cage and a balance weight suspended from the sheaves in the form of a well bucket are raised or lowered. In many cases, therefore, the sheaves are affected by an unbalance torque due to the difference in weight between the elevator cage and the balance weight. Therefore, a brake device, which functions to stop and retain or support the elevator cage at their stopped position, is required to have a high level of safety.

For the above-mentioned reasons, a rigid drum type electromagnetic brake, which is disclosed in, for example, Japanese Patent Unexamined Publication No. 57-1180, has hitherto been employed.

Meanwhile, in an elevator equipped with a gear reducer called "geared elevator", a worm gear reducer has hitherto been employed. With this worm gear, the efficiency of torque transmission from an electric motor to sheaves is very high whereas the retrograde efficiency of torque transmission from the sheaves to an electric motor is considerably low. Accordingly, this worm gear reducer is advantageous in respect of lessening the possibility that the normal rotation of the electric motor is hindered by the unbalance torque.

On the other hand, the use of a parallel axis gear reducer has recently been proposed in place of such worm gear reducer.

In this case, however, the retrograde efficiency also is increased with the result that much more care must be taken about the safety of the brake device.

Further, for miniaturization of the brake device, change-over from the drum type electromagnetic brake device to a disk type brake device has also been proposed.

In the field of a disk type brake device, detection of the operating condition of a brake device is known as disclosed in Japanese Patent Unexamined Publication No. 58-109741.

Further, in the field of an elevator, it is known that an unbalance torque is detected on the basis of an amount of displacement of a retainer or support section for the electromagnetic brake device to thereby be used for control of the brake as in said Japanese Patent Unexamined Publication No. 57-1180, or that an unbalance torque as in Japanese Patent Unexamined Publication No. 62-56277 is detected on the basis of distortion of a retainer section for the electromagnetic brake device to thereby be used for control of, for example, starting compensation for an elevator.

The safety and reliability of brake devices including the disk type brake device, etc. have already been established. In case of elevators, however, it is desirable to take perfect measures for safety.

What is the most important matter for the brake device of an elevator is as follows. Namely, during the running of an elevator, electricity is supplied to braking coils. When, however, the attractive force of the braking coils has decreased for some malfunction to amount to half of a normal attractive force, an armature of the brake is caused to contact with a lining thereof while the latter is being rotated. The wear of the lining thus is further vigorous due to the friction between the two until a braking force could not be obtained even if the supply of electricity to the coils is paused. This is a very important point which may lead to accidents resulting in injury or death, for the brake device for causing the elevator to be stopped and supported or retained at its stopped position.

In an elevator including many operating conditions, or in an elevator in which an unbalance torque always acts, it is desirable to prevent the occurrence of any accident when some malfunction occurs in the brake device including a disk brake device and the like. To this end, it is also desirable to realize such a system as would be able to prevent the occurrence of any such accident.

SUMMARY OF THE INVENTION

Accordingly, an object of the present invention is to reduce the possibilities of accidents by way of precaution against abnormality or malfunction of the brake device included in the elevator apparatus.

The present invention is directed to an elevator apparatus including an electric motor for driving an elevator, an elevator cage raised or lowered by the electric motor, and a brake device for causing an elevator driving system including the electric motor to be stopped and retained at its stopped position, the elevator apparatus being mainly characterized in that it comprises a malfunction detecting device operative to respond to the application of a torque to a retainer section of the brake device during the raising or lowering of the elevator cage.

The present brake device generates a braking force by stopping and retaining its torque by means of its retainer section. On the other hand, the brake device causes its retainer section to release its rotating body, for free rotation. The most dangerous malfunction happens when the retainer section loses its ability to stop and retain the rotating body. That is, when the rotating body must have been being released, the rotating body and the retainer section are in a half-contact condition (i.e., the half-attraction of the rotating body by the retainer section takes place), so that the rotating body continues to move while rubbing the braking surface, or lining, of the brake device. Consequently, the stopping and retaining (braking) ability of the retainer section comes to be decreased or lost due to wear or burning.

For the above-mentioned reasons, a half-contact condition (half-attraction) with respect to the rotating body and the retainer section of the brake device during the raising or lowering of the elevator cage is detected on the basis of the acting of torque upon the retainer section so that some measures for precaution are taken.

By so doing, it is possible to greatly lessen the possibility that the brake device loses its ability of stopping and retaining the elevator driving system at its stopped position to cause the occurrence of serious accidents.

DESCRIPTION OF THE PREFERRED EMBODIMENTS

A preferred embodiment of the present invention will now be described with reference to FIGS. 1 to 6.

Figure 1:
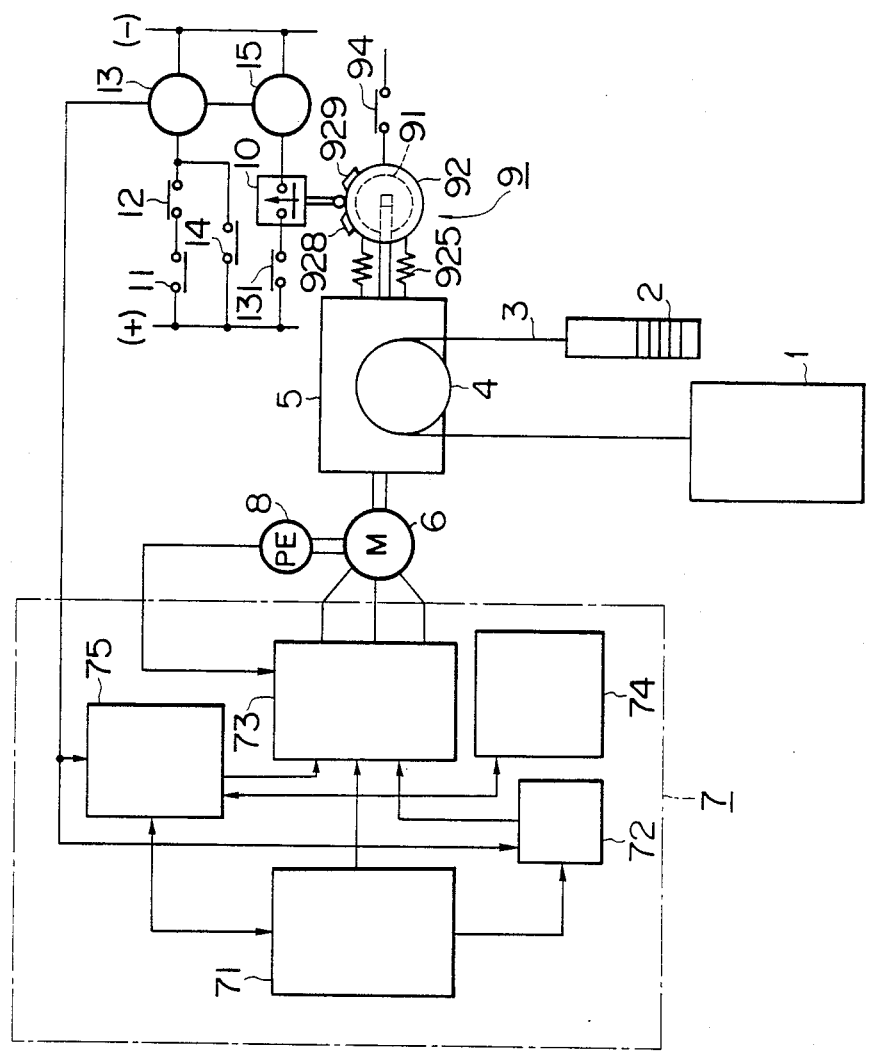
FIG. 1 is a schematic constructional view of an elevator apparatus as a whole according to an embodiment of the present invention.

FIG. 1 is a schematic constructional view of the entire elevator apparatus according to an embodiment of the present invention. The elevator apparatus includes an elevator cage 1 and a balance weight 2, which are connected to each other by means of a length of rope 3 and which are suspended from sheaves 4 in the form of a well bucket. The sheaves 4 are connected to an elevator-driving three-phase induction motor 6 via a parallel axis gear reducer 5.

A control device 7 includes a velocity command generating section 71, a torque command generating section 72, and a torque control section 73 having a PWM inverter. A velocity command which has been issued from the velocity command generating section 71 is supplied to the section 72 which supplies a torque command to the torque control section 73. The torque control section receives as a feedback input an output from a velocity detector (pulse encoder) 8 to make vector control of the frequency w, phase $\theta$ and current i of a three-phase alternating electric power supplied to the induction motor 6.

The control device 7 further includes an elevator operation control section 74 for effecting other control required for an elevator than the velocity control, and a brake malfunction detecting section 75 which constitutes an essential part of the present invention. This brake malfunction detecting section 75 executes its processing operations by means of a microcomputer within the control device 7, which processing operations will be later described with reference to a flow chart.

A disk brake 9 includes a rotating body 91 connected to an elevator driving system including sheaves 4, a reducer 5 and the electric motor 6, and a retainer section 92 for causing the rotating body 91 to be braked or stopped and retained at its stopped position. The retainer section 92 is elastically supported on a structure of a machine room by means of an elastic body 925. When a switch 94 is closed, the retainer section 92 releases the rotating body 91 so as to make it freely rotatable. When the switch 94 is opened, the retainer section 92 brakes the rotating body 91 to stop and retain the same at its stopped position. The retainer section 92 is equipped with a pair of cams 928 and 929. Rotation of the cams in a normal or reverse direction causes the closing of the microswitch 10.

Meanwhile, a contact 11, which is turned on when the elevator cage 1 is located at other positions than a zone of door opening of each floor, and a contact 12, which is turned on when the travel or running speed of the elevator is higher than a specified speed, are connected in series (AND circuited) to energize a relay 13. Accordingly, while the elevator cage is running at areas other than the door opening zone of each floor at high speed, the relay 13 is energized to close its contact 131 to thereby make the operation of the microswitch 10 effective, which energizes a relay 15. Upon energization of the relay 15, a signal therefrom is supplied to the brake malfunction detecting section 75 within the control device 7.

When the elevator cage 1 is being stopped at any given floor and when, during this stoppage, three minutes lapse without a sign for starting the running of the elevator, the contact 14 is turned on to energize the relay 13 to make the contact 131 37 on" to thereby make the microswitch operation effective. This starts the checking of the function of the brake malfunction detecting section per se as later described.

Figure 2:
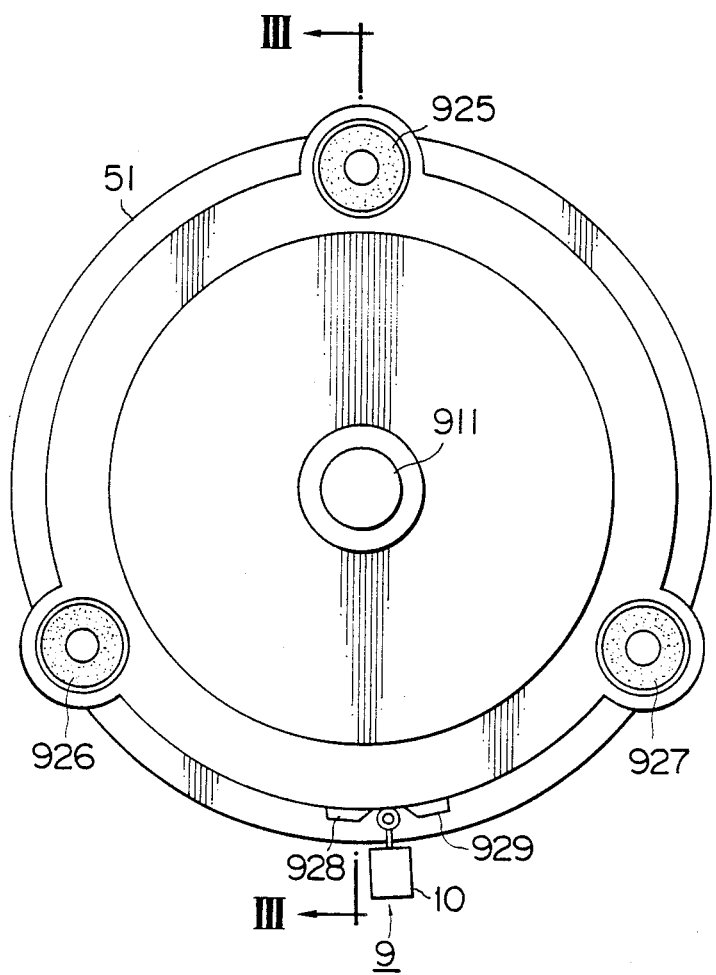
FIG. 2 is a front view of a disk brake device for use in an elevator thereof.
Figure 3:
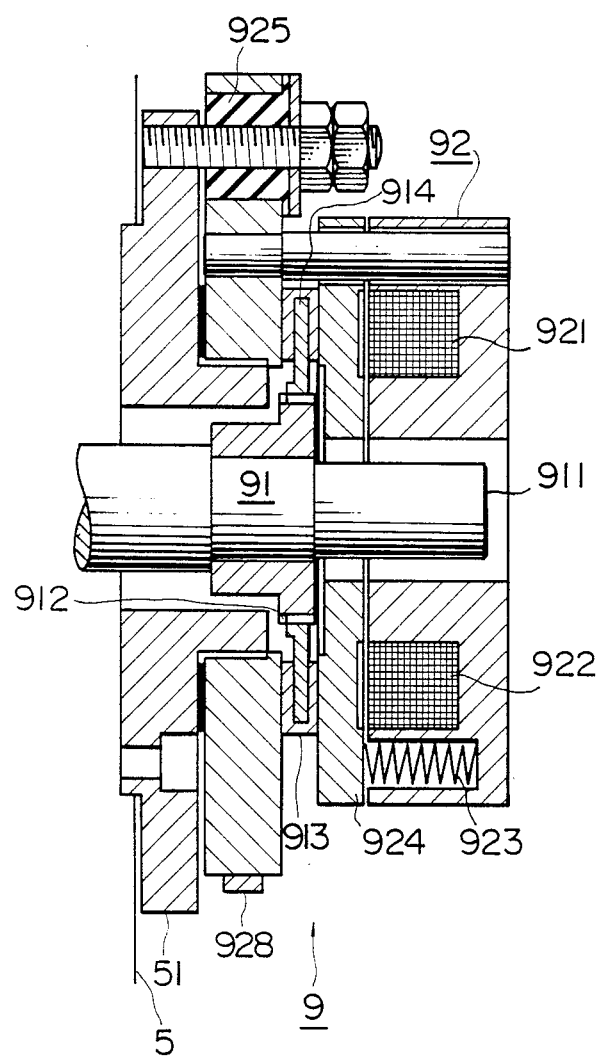
FIG. 3 is a sectional view taken along the line III—III of FIG. 2.

FIG. 2 is a front schematic view of the disk brake device, and FIG. 3 is a sectional view taken along the line III—III of FIG. 2.

The brake device basically comprises the rotating body 91 connected to a rotating shaft of the elevator driving system and adapted to rotate, and the retainer section 92 for effecting the braking of the rotating body 91 to stop and retain the same at its stopped position. The rotating body 91 comprises a brake disk 914 provided with a lining 913 and mounted on a hoist shaft 911 by way of a spline 912. On the other hand, the retainer section 92 of the brake device comprises coils 921, 922, a spring 923, a movable member 924, etc. as known disk brake members. It is to be noted in this connection that the retainer section 92 as a whole is coupled, via elastic members or rubber members 925 to 927, to a member 51 secured to the reducer (hoist) 5, and that the retainer section 92 can be displaced by rotation through an angle of small degrees. In order to detect this rotary displacement by means of the microswitch 10, the pair of cams 928 and 929 are provided.

In the disk type electromagnetic brake device 9 having the described construction, during the halt of the elevator, the movable member 924 is biased by means of the spring 923 to clamp the disk 914 and the lining portions. Thus, the device 9 overcomes the unbalance torque by its frictional force developed between the member 924 and the lining, thereby applying a braking force onto the elevator driving system to maintain the same at its stopped position.

When it is desired to start the running of the elevator, the switch 94 shown in FIG. 1 is closed to energize the coils 921 and 922, thereby attracting the movable member 924 to release the disk to make the same freely rotatable.

Since the brake device is of a structure wherein its retainer section is elastically and rotatably supported by the hoist, the retainer section 92 is displaced in the rotational direction of a brake shaft when the braking is to be effected. This displacement actuates the microswitch 10 provided on the stationary side, thereby providing detection of application of the brake torque. Normally, during the travel of the elevator, the brake disk is released and made freely rotatable. That is, the brake torque is zero. However, when the elevator runs in a state wherein the brake device is in a condition of half-attraction due to some malfunction, some torque is applied onto the brake disk, so that the microswitch acts. Namely, malfunction of the brake device can be detected on the basis of a running signal of the elevator and an operation signal of the microswitch.

Figure 4:
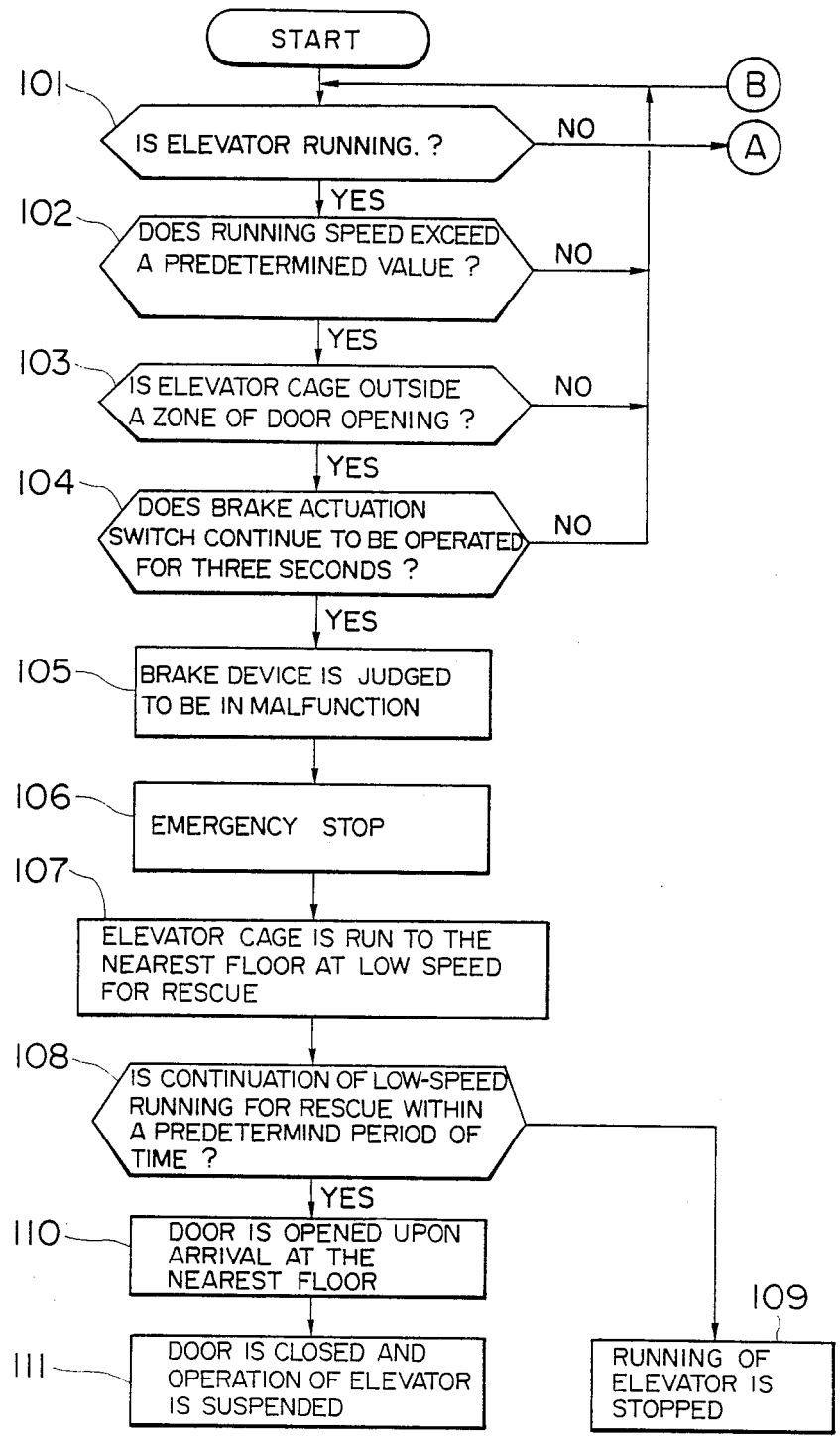
FIGS. 4 and 5 are flow charts for processing operations performed by a brake-malfunction detecting section according to an embodiment of the present invention; and, FIG. 6 is an illustration of the operation of the detecting section.
Figure 5:
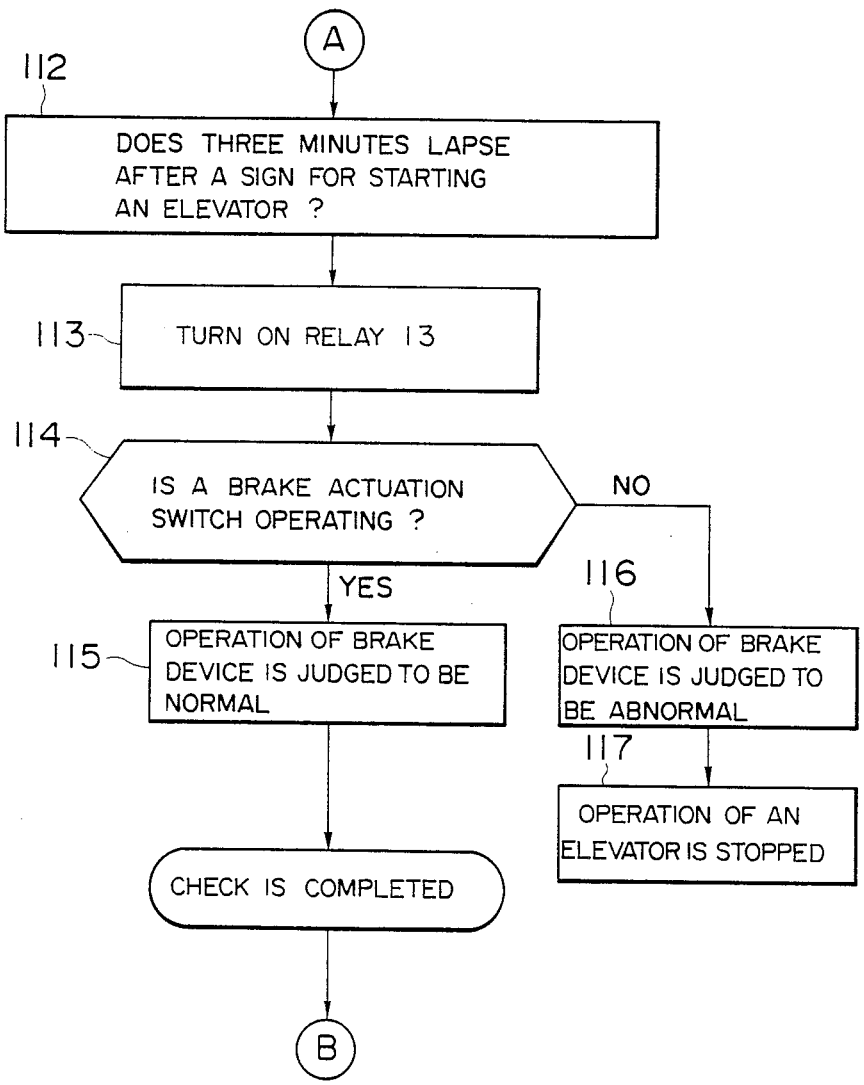

FIGS. 4 and 5 are flow charts illustrating an example of the processing operation performed by the brake malfunction detecting section 75 according to the present invention.

Firstly, it is judged in step 101 whether or not the elevator is running or traveling. If the elevator is traveling (YES), the operation proceeds to step 102 in which it is confirmed that the traveling speed is higher than a predetermined value. If the traveling speed of the elevator is higher than a predetermined traveling speed, the operation proceeds to step 103. In this step 103, it is judged whether or not the elevator cage is located at other position than the door opening zone. Accordingly, insofar as the elevator cage 1 is traveling at an area other than the door opening zone at high speed, the operation proceeds to step 104, in which it is confirmed whether or not the brake operation switch (microswitch) 10 is in normal operation.

In FIG. 1, illustration is made in the form wherein the processing operation is executed by the relay sequence up to a midway of step 104 following steps 101 to 103. Depending upon whether or not the relay 15 is energized, it is judged whether or not the brake device 9 involves malfunction.

By way of the foregoing operations, the following operations are carried out. Namely, when the brake device has been brought to a state of half-attraction during the running of the elevator such that the disk rotates while rubbing the lining, the relay 15 is energized. Continuation of this energization for three seconds causes the brake malfunction detecting section 75 to judge that the brake device is in malfunction (step 105) and to execute the following processing of precaution. After judgement of malfunction has been made, the elevator can be high-speed travelled to the nearest floor, while according to this embodiment the elevator is stopped in an emergency as a temporary measure in step 106. Then, in step 107, the elevator cage 1 thus once halted is low-speed traveled to the nearest floor for rescue.

However, in case the low-speed operation for rescue is not ended within a specified period of time, there exists a possibility that the brake device has been further worn or damaged and the operation for rescue is then regarded as being in danger, so that the elevator is stopped (steps 108 and 109). If the elevator cage reaches the nearest floor within such specified period of time, an elevator door would be opened in step 110 and, after escape of passengers, be again closed and the elevator would be stopped in step 111. Simultaneously, display is made, in a supervisor room, of the information that "The Elevator Is Stopped Due To Malfunction of The Brake Device".

On the other hand, in case the answer to the question in steps 102 and 103 is "NO", malfunction diagnosis is not made. The reason for this is as follows.

In order for the elevator to be halted, the relay 13 is not energized and its contact 131 is kept open when the elevator is running at low speeds or the elevator cage is located within the zone of door opening such that the brake device 9 is frequently actuated. Each time the frequent halting of the elevator is effected, the brake device 9 operates and the microswitch 10 also operates. Therefore, if energization and deenergization of the microswitch 10 are repeated for each such normal operation, the microswitch 10 would be reduced in service life and its electric service life would be ended within a term of even one year.

A contact of the microswitch has a sufficient length of mechanical service life but is short in its electric service life which amounts to an extent of five hundred thousand times. The elevator is a machine which has high frequency in starting and which can be started about two thousand times a day. Each time the starting and halting of the elevator are effected, the brake device repeats its attraction and release. Therefore, since the contact of the microswitch also is turned on and off accordingly, the microswitch will fail to stand a term of even one year. In contrast, according to this embodiment, at the time of normal stoppage of the elevator, the microswitch effects neither energization nor deenergization, so that it is possible to extend or prolong the electric service life of the microswitch semi-permanently.

Further, the reason why, in steps 104 and 105, it is judged that the brake device is in mulfunction only when operation of the microswitch 10 continues for three seconds or more is for the purpose of overlooking chattering of the contact, some erroneous operation due to non-reproducible and transitory noises, etc.

Now, in case it is judged in step 101 that the elevator is kept halted, the operation proceeds to steps in a flow chart of FIG. 5. In case it is judged that three minutes have lapsed after the ending of a sign to start the running of the elevator, the relay 13 is turned on in step 113. Namely, in FIG. 1, the relay 13 is compulsively turned on by closure of the contact 14 adapted to be turned on when three minutes have lapsed after ending of the sign. Then, the contact 131 of the relay 13 is closed. Accordingly, by utilizing the operation checking function of the microswitch 10 in FIG. 1, the operation thereof is confirmed or checked in step 114. Thus, the result of this confirmation is sent to the brake malfunction detecting section 75 in the form of an "on" or "off" information of the relay 15. If the microswitch 10 is in operation, it is judged in step 115 that the brake device is in a normal state of operation and the checking of the brake device by the microswitch then is finished. If three minutes have lapsed after ending of the sign, insofar as the brake device is normal, the retainer section 92 would be rotated and displaced with the result that the microswitch 10 must also be in operation. This is because the elevator cage 1 is empty and therefore the balance weight 2 is heavier than the elevator cage and therefore this unbalance torque is rendered ineffective by action of the brake device 9, so that the two are retained at their stopped positions. When it is now assumed that the microswitch 10 at this time is kept out of operation, then it is judged in step 116 that the brake abnormality detecting function is out of normal operation. Thus, in step 117, the running of the elevator is stopped and an information to this effect is given to the supervisor room.

FIG. 6 is an illustration of the contacts in steps 102 and 103 and the malfunction diagnosis action in FIG. 5. When the elevator cage is located in the zone of door opening or runs at low speeds, the relay 13 in principle is turned off to make the brake abnormality detecting function inoperative. When, at this time, any sign for elevator-starting is not given for three minutes or more, the checking of whether or not said brake abnormality detecting function per se can normally operate is executed. Since this brake abnormality detecting function works rarely, it is of significance to check whether or not it can normally operate.

According to the present invention, it is possible to lessen the possibility of accidents due to the malfunction of the brake device of the elevator apparatus.

What is claimed is:

1. In an elevator apparatus including an electric motor for driving said elevator, an elevator cage lifted or lowered by said electric motor, and a brake device for stopping and retaining an elevator driving system, the improvement comprising a malfunction detecting means operative in response to the application of a torque to a retainer section of said brake device during the lifting or lowering of said elevator cage.

2. An elevator apparatus according to claim 1, wherein said malfunction detecting means operates in response to application of torque to said retainer section of said brake device being continued for a predetermined period of time or more.

3. An elevator apparatus according to claim 1, further comprising means for stopping said elevator cage in response to an output from said malfunction detecting means.

4. An elevator apparatus according to claim 1, further comprising means for causing said elevator cage to halt at the nearest floor in response to an output from said malfunction detecting means.

5. An elevator apparatus according to claim 1, further comprising means for causing said elevator cage to once halt in response to an output from said malfunction detecting means and then be moved and halted at the nearest floor.

6. An elevator apparatus according to claim 4 or 5, further comprising means for stopping said elevator cage in response to a predetermined period of time being exceeded by a period of time during which said elevator cage is run by said means for causing said elevator cage to stop at said nearest floor.

7. An elevator apparatus according to claim 1, wherein said malfunction detecting means comprises an electric switch means, and means for rendering ineffective the detecting function of said malfunction detecting means when said elevator cage is located in a door opening zone of each floor.

8. An elevator apparatus according to claim 1, wherein said malfunction detecting means comprises an electric switch means, and means for rendering ineffective the detecting function of said malfunction detecting means when the running speed of said elevator cage is less than a predetermined value.

9. An elevator apparatus according to claim 7 or 8, further comprising means for confirming the operation of said electric switch means when suspension of said elevator cage continues for a predetermined period of time or more.

10. In an elevator apparatus including an electric motor for driving the elevator apparatus, an elevator cage lifted or lowered by said electric motor, and a brake device for causing an elevator driving system to be stopped and retained, the improvement comprising a resiliently supported retainer section for a rotating body, means for detecting the rotating displacement of said retainer section, and a malfunction detecting means operative in response to the operation of said displacement detecting means during the lifting or lowering of said elevator cage.

11. In an elevator apparatus including an electric motor for driving the elevator apparatus, a hoist having sheaves adapted to be driven by said electric motor, an elevator cage and a balance weight suspended from said sheaves in a manner like a well bucket via a rope, and a brake device for holding an unbalance torque produced between said elevator cage and said balance weight, the improvement wherein said brake device comprising a brake disk, a disk-retainer section resiliently supported for retaining or releasing said brake disk, a switch means operative in response to the rotation and displacement of said disk-retainer section in a normal or reverse direction, a malfunction detecting means operative in response to the operation of said switch means during the lifting or lowering of said elevator cage, and means responsive to an output from said malfunction detecting means to effect emergency suspension of said elevator cage.

* * * * *